United States Patent
Appel et al.

(10) Patent No.: US 11,539,724 B2
(45) Date of Patent: Dec. 27, 2022

(54) CENTRALIZED DETECTION TECHNIQUES FOR CYBER-ATTACKS DIRECTED AT CONNECTED VEHICLES

(71) Applicant: Upstream Security, Ltd., Herzliya (IL)

(72) Inventors: Yonatan Appel, Ramat Hasharon (IL); Yoav Levy, Kfar-Vitkin (IL); Dor Attias, Beer Sheva (IL)

(73) Assignee: Upstream Security, Ltd., Herzliya (IL)

( * ) Notice: Subject to any disclaimer, the term of this patent is extended or adjusted under 35 U.S.C. 154(b) by 224 days.

(21) Appl. No.: 17/116,010

(22) Filed: Dec. 9, 2020

(65) Prior Publication Data
US 2021/0258328 A1   Aug. 19, 2021

Related U.S. Application Data

(60) Provisional application No. 62/949,108, filed on Dec. 17, 2019.

(51) Int. Cl.
*H04L 9/40* (2022.01)
*H04L 67/12* (2022.01)

(52) U.S. Cl.
CPC ........ *H04L 63/1416* (2013.01); *H04L 63/145* (2013.01); *H04L 63/1433* (2013.01); *H04L 67/12* (2013.01)

(58) Field of Classification Search
CPC ............. H04L 63/1416; H04L 63/1433; H04L 63/145; H04L 67/12; H04L 63/1441; H04L 63/1425; H04W 4/44; H04W 4/40; H04W 4/80
See application file for complete search history.

(56) References Cited

U.S. PATENT DOCUMENTS

| | | | | |
|---|---|---|---|---|
| 2015/0350914 | A1* | 12/2015 | Baxley | H04W 72/0453 726/11 |
| 2020/0314116 | A1* | 10/2020 | Rodriguez Bravo | H04W 12/121 |
| 2021/0176259 | A1* | 6/2021 | Park | H04L 12/40032 |
| 2021/0258327 | A1* | 8/2021 | Felke | H04L 63/1441 |

* cited by examiner

*Primary Examiner* — Ali S Abyaneh
(74) *Attorney, Agent, or Firm* — M&B IP Analysts, LLC

(57) ABSTRACT

Systems and methods for detecting and mitigating cyber-attacks directed to connected vehicles. A method includes classifying a behavior of a connected vehicle into at least one classification with respect to a location of data transmission relative to the connected vehicle, wherein the at least one classification includes any of local and remote; determining a plurality of vehicle-related cyber-attack indicators related to the behavior of the connected vehicle; performing risk analysis based on a first combination of vehicle-related cyber-attack indicators and the classification, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle; and performing at least one mitigation action based on the risk analysis.

15 Claims, 4 Drawing Sheets

CENTRALIZED DETECTION TECHNIQUES FOR CYBER-ATTACKS DIRECTED AT CONNECTED VEHICLES

CROSS-REFERENCE TO RELATED APPLICATIONS

This application claims the benefit of U.S. Provisional Patent Application No. 62/949,108 filed on Dec. 17, 2019, the contents of which are hereby incorporated by reference.

TECHNICAL FIELD

The present disclosure relates generally to cybersecurity techniques for connected vehicles, and more specifically to detection of cyber-attacks based on vehicle telemetries.

BACKGROUND

With advances in computer technology, computerized navigation and control systems in vehicles have been created to improve drivers' experiences and to allow for remotely controlled transportation of people and goods. To this end, computerized control and management services may collect data remotely from systems deployed in vehicles. For example, a navigation system installed in a vehicle may collect and upload (e.g., via a cellular network) telemetry data such as mechanical data related to components of the vehicle, location data, functional data related to vehicle activities (e.g., movements, use of horn, etc.), and the like. Prior to introduction of such computerized control and management systems, collection of such data was not possible.

While computerized vehicle systems can be incredibly useful for vehicle operators, these systems leave vehicles exposed to new dangers. Specifically, malicious entities can control or disrupt vehicle functions and, therefore, may misappropriate the vehicle for their own purposes. This opens the door to vehicle failure, theft, and other malicious activity, which can lead to death, injury, and financial damage. In-vehicle cyber attacks may originate, for example, by a malicious entity (for example, a hacker) connecting to a vehicle either physically or through a wireless interface (for example, a local wireless interface such as Bluetooth).

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting and mitigating cyber-attacks directed to connected vehicles. The method comprises: classifying a behavior of a connected vehicle into at least one classification with respect to a location of data transmission relative to the connected vehicle, wherein the at least one classification includes any of local and remote; determining a plurality of vehicle-related cyber-attack indicators related to the behavior of the connected vehicle; performing risk analysis based on a first combination of vehicle-related cyber-attack indicators and the classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle; and performing at least one mitigation action based on the risk analysis.

Certain embodiments disclosed herein also include a non-transitory computer readable medium having stored thereon causing a processing circuitry to execute a process, the process comprising: classifying a behavior of a connected vehicle into at least one classification with respect to a location of data transmission relative to the connected vehicle, wherein the at least one classification includes any of local and remote; determining a plurality of vehicle-related cyber-attack indicators related to the behavior of the connected vehicle; performing risk analysis based on a first combination of vehicle-related cyber-attack indicators and the classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle; and performing at least one mitigation action based on the risk analysis.

Certain embodiments disclosed herein also include a system for detecting and mitigating cyber-attacks directed to connected vehicles. The system comprises: a processing circuitry; and a memory, the memory containing instructions that, when executed by the processing circuitry, configure the system to: classify a behavior of a connected vehicle into at least one classification with respect to a location of data transmission relative to the connected vehicle, wherein the at least one classification includes any of local and remote; determine a plurality of vehicle-related cyber-attack indicators related to the behavior of the connected vehicle; perform risk analysis based on a first combination of vehicle-related cyber-attack indicators and the classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle; and perform at least one mitigation action based on the risk analysis.

BRIEF DESCRIPTION OF THE DRAWINGS

The subject matter disclosed herein and other objects, features, and advantages of the disclosed embodiments will

DETAILED DESCRIPTION

Figure 1:
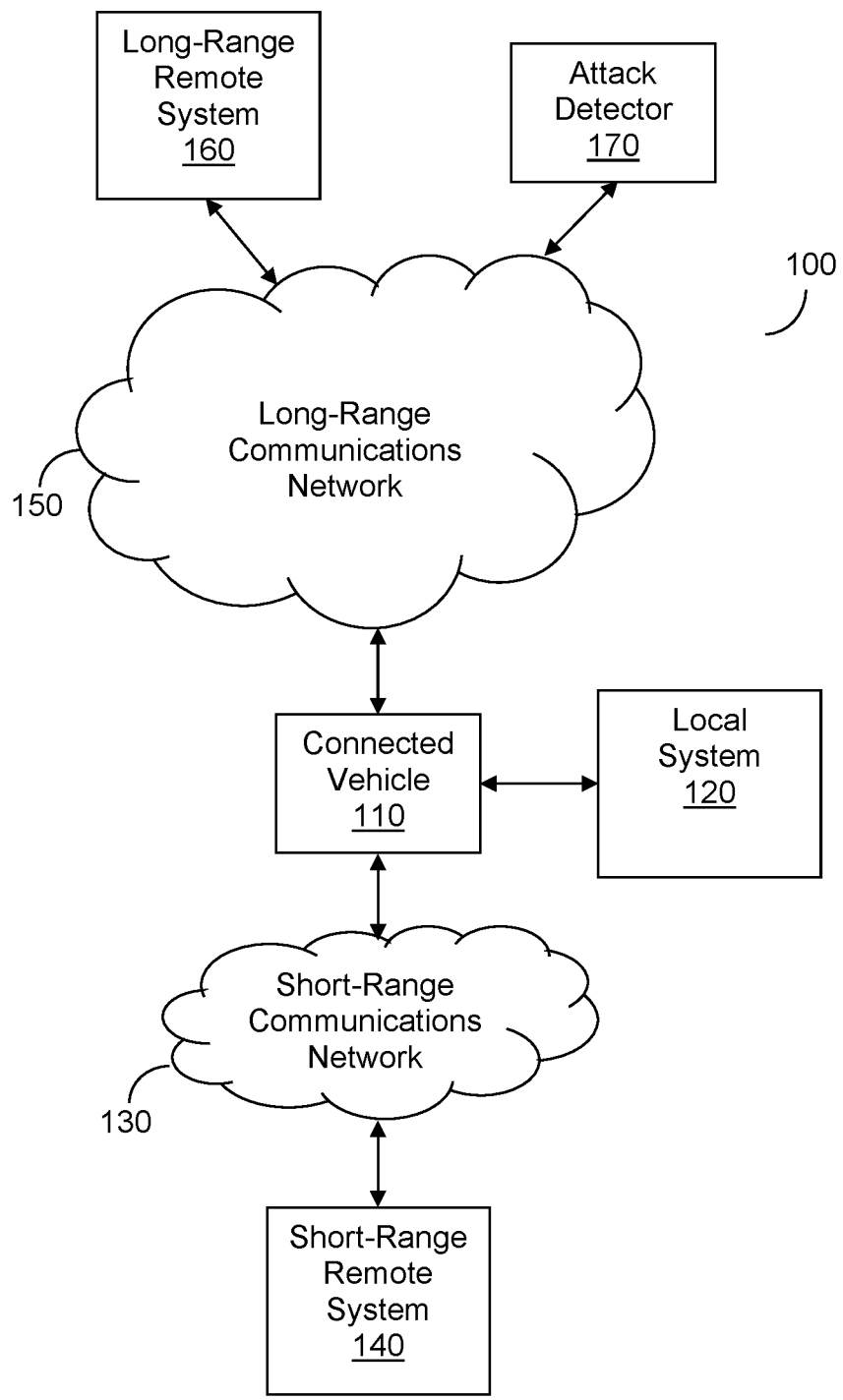
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Although connected vehicles provide opportunities for collecting data related to vehicle performance (e.g., in the form of telemetries), extracting meaningful anomalies from such data continues to be a challenge. It has been identified that these telemetries may allow for more accurate identification of cyber-attacks when contextualized by supplementing the telemetries with contextual information related to the telemetries such that meaningful anomalies can be extracted from these contextualized telemetries.

The various disclosed embodiments include techniques for detecting cyber-attacks directed to connected vehicles. The disclosed embodiments may be utilized by a centralized detection system configured as described herein to allow for creating complete views of security statuses of connected vehicles and for effectively identifying attack paths.

To this end, the disclosed embodiments include techniques for detecting cyber-attack events based on telemetries from a connected vehicle. The telemetries include data collected by the connected vehicle during operation which may be sent to an external system for analysis. The telemetries may include, but are not limited to, results of authentication attempts, error codes, commands received, entities communicating with the connected vehicle, scan attempts, connected vehicle activities (e.g., accelerating, braking, turning, use of turn signals, use of lights, etc.), infotainment system information, local connection information (e.g., Bluetooth connections), and the like.

A behavior related to a connected vehicle is classified based on relative location of the activity with respect to the connected vehicle. Indicators of cyber-attacks related to the classified behavior are detected in the vehicle telemetries. The indicators include domain knowledge indicators, anomaly indicators, or both. A risk analysis is performed based on the detected indicators. The risk analysis includes comparing a combination of the cyber-attack indicators to predetermined combinations of indicators of known attack patterns that fall into the same classification of location relative to a connected vehicle. Mitigation actions are selected and implemented based on the risk analysis.

Various disclosed embodiments further include classifying potentially malicious behavior as either local or remote. A local behavior includes only transmission of data within the connected vehicle, for example via a physical connection or within an internal vehicle network. A remote behavior includes transfers of data outside of the vehicle, for example through a wireless connection with an external system.

Further classifications may also be determined and utilized. The further classifications may be with respect to sub-locations relative to the connected vehicle, physical proximity of communicating systems, different types of communication vectors, combinations thereof, and the like.

In this regard, it has been identified that many types of cyber-attacks follow the same pattern with respect to the flow of data inside and outside of the vehicle. Accordingly, classifying behaviors into local or remote, allows for providing more accurate identification of cyber-attacks (e.g., lower rates of false positive and false negative, more accurate classification of types of cyber-attacks, etc.). Additionally, classifications such as classification by sub-location, physical proximity, or type of attack vector, allows for further improving accuracy by increasing the granularity of the data used for identifying cyber-attacks.

FIG. 1 is an example network diagram 100 utilized to describe various disclosed embodiments. In the network diagram 100, a connected vehicle 110 communicates with a local system 120, a short-range remote system 140, a long-range remote system 160, and a detector 170. The connected vehicle 110 may communicate with the short-range remote system 140 via a short-range communications network 130 and with the long-range remote system 160 via a long-range communications network 150.

The connected vehicle 110 is configured to receive and send data, and may be further configured to implement commands in the received data (for example, a "Start Engine" command). To this end, the connected vehicle 110 includes computer components (not shown) such as, but not limited to, a processing circuitry, a memory, a network interface, and the like. A connected vehicle may be, but is not limited to, a car, a bus, a truck, a ship, a plane, a robot, and the like. It should be noted that the connected vehicle 110 may be, but is not limited to, an autonomous vehicle, a semi-autonomous vehicle, or a non-autonomous vehicle. The connected vehicle 110 may be at least partially controlled remotely. Data collected by the connected vehicle 110 may include, but is not limited to, telematics, vehicle sensor data, in-vehicle commands, over-the-air (OTA) update data, log analytics, Lidar data, radar data, images, videos, location data, message data, and the like.

Each of the local system 120, the short-range remote system 140, and the long-range remote system 160 may be any system configured to communicate with a connected vehicle. Non-limiting examples for such systems include servers, user devices (e.g., smartphones, tablet computers, laptop computers, etc.), and the like. Such systems may be configured to communicate with the connected vehicle 110 either directly or indirectly for purposes such as, but not limited to, sending commands for actions to be performed by the connected vehicle 110, sending over-the-air (OTA) data, sending requests for data from the connected vehicle 110, and the like.

The local system 120 communicates with the connected vehicle 110 via a local port or interface (not shown) or via an internal network (not shown) of the connected vehicle 110. The short-range remote system 140 is in physical proximity to the connected vehicle 110 such that it can communicate with the connected vehicle 110 directly (e.g., via Bluetooth), via a local network (e.g., a WiFi network), or via an on-board diagnostics (OBD) device. The long-range remote system 140 is not in physical proximity to the connected vehicle 110.

Each of the short-range communications network 130 and the long-range communications network 150 is a network or combination of networks such that their respective remote systems 140 and 160 may communicate with the connected vehicle 110 via that network. It should be noted that, at least in some implementations, the short-range remote system 140 may not communicate via the short-range communications network 130. As a non-limiting example, the short-range remote system 140 may communicate with the connected vehicle 110 directly using a radio frequency (e.g., via Bluetooth) without a network.

It should also be noted that the short-range communications network 130 may also be utilized to facilitate long-range communications in accordance with the disclosed embodiments. As non-limiting examples, an OBD device may provide access to a general packet radio service (GPRS) modem or a mobile device connected to the connected vehicle 110 through a Bluetooth interface may provide access to the Internet through a cellular data network.

The detector 170 is configured to detect cyber-attacks in accordance with the disclosed embodiments. To this end, the detector 170 is configured to receive telematics from the connected vehicle 110 as well as communications data related to communications between the connected vehicle 110 and any of the local system 120, the short-range remote system 140, the long-range remote system 160, and any devices used to facilitate long-range communications via short-range communications networks.

In an embodiment, the detector 170 is configured to detect cyber-attacks based on telemetries from the connected vehicle 110 in accordance with the disclosed embodiments. More specifically, the detector 170 is configured to contextualize the telemetries based on information related to the flow of data in and out of the connected vehicle 110. Such information may include, but is not limited to, relative location of entities communicating with the connected vehicle 110 (e.g., local or remote, short range or long range), combinations of events related to the connected vehicle 110, information related to communications with external entities (e.g., infotainment system information, local connection information, etc.), and the like.

In a further embodiment, the detector 170 is configured to classify behaviors determined based on communications with the connected vehicle 110 based on the relative locations of entities communicating with the connected vehicle 110. For example, behaviors may be classified as either local or remote, and remote behaviors may be further classified into short-range or long-range. The classifications of behaviors may be utilized to enrich telemetry data, thereby contextualizing the telemetry data and allowing for more accurate detection of cyber-attacks using the telemetry data.

It should be noted that only one each of the connected vehicle 110, the local system 120, the short-range and long-range communications networks 130 and 150, and the short-range and long-range remote systems 140 and 160 are depicted in FIG. 1 merely for simplicity purposes, but that multiple of any or all of these network diagram components may be utilized in accordance with the disclosed embodiments. Further, in different implementations, only some of the local system 120, the short-range remote system 140, and the long-range remote system 160 may communicate with the connected vehicle 110.

It should also be noted that the attack detector 170 is not limited to the particular deployment with respect to the connected vehicle 110 shown in FIG. 1. As a non-limiting example, the attack detector 170 may be deployed such that, for example, it communicates with the connected vehicle 110 over a short-range communications network. As another non-limiting example, the attack detector 170 does not need to communicate directly with the connected vehicle 110 in order to obtain in-vehicle data, and in at least some implementations may obtain the in-vehicle data from another source such as an external system (not shown) to which the connected vehicle 110 sends such data.

It should further be noted that a single local system is illustrated in FIG. 1 merely for simplicity purposes, but that multiple local systems may equally communicate within the connected vehicle 110 without departing from the scope of the disclosed embodiments. When multiple local systems communicate, their communications may be logically broken down into stages. These stages may be used to add further granularity to location-based classification by adding sub-local classifications.

Figure 2:
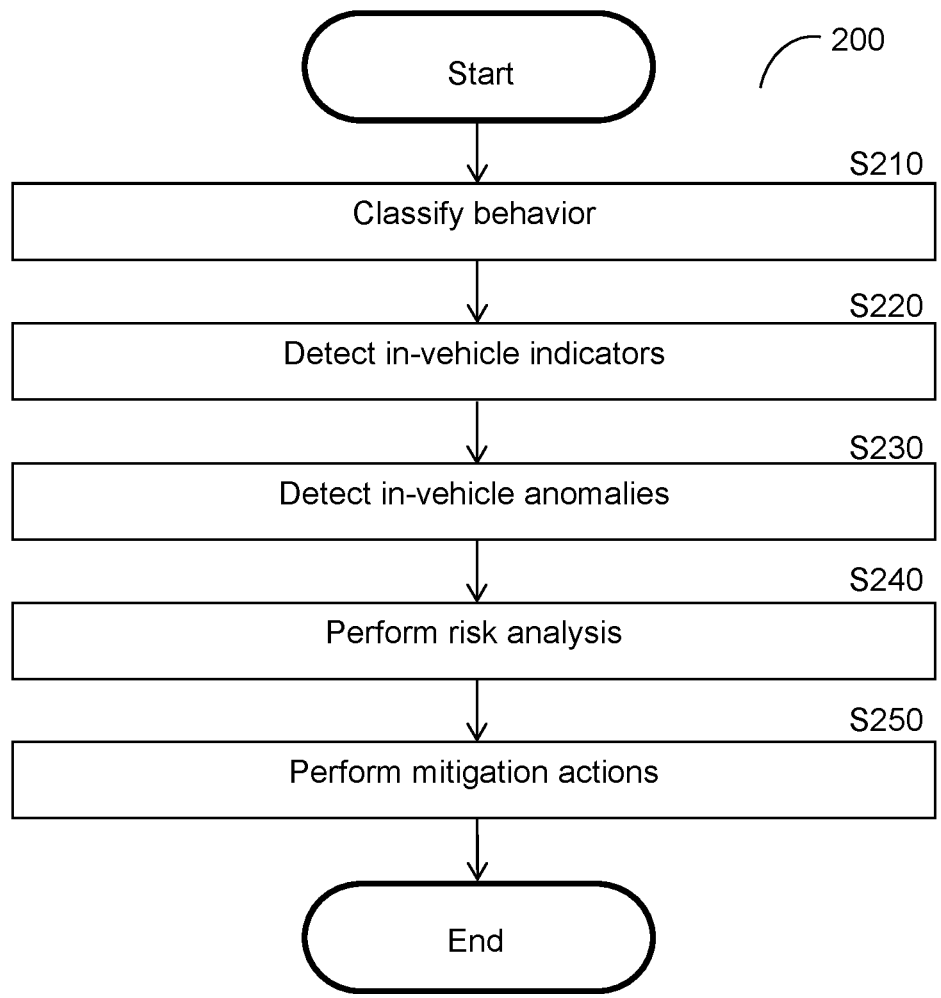
FIG. 2 is a flowchart illustrating a method for detecting cyber-attacks directed to connected vehicles according to an embodiment.

FIG. 2 is an example flowchart 200 illustrating a method for detecting cyber-attacks directed to a connected vehicle according to an embodiment. In an embodiment, the method is performed by the detector 170, FIG. 1.

At S210, behavior related to a connected vehicle is classified based on relative locations with respect to the connected vehicle. The behavior related to the connected vehicle includes transmission of data within the connected vehicle (e.g., within a network of the connected vehicle) or otherwise with the connected vehicle (e.g., communications via an external network or direct connection to the connected vehicle).

In an embodiment, the behavior is classified into local or remote based on where the behavior occurs relative to the connected vehicle. The classification may be based on relative locations of entities communicating with the connected vehicle (or lack thereof) as part of the behavior.

Local behavior includes transfers of data within the connected vehicle, for example via a physical connection with the connected vehicle or via an internal vehicle network of the connected vehicle. Non-limiting examples of local behavior include behavior occurring via an on-board diagnostics parameters identifiers (OBD-II) port, controller area network (CAN) frame injection, local firmware upgrades, and the like.

Remote behavior includes transfers of data outside of the vehicle such as, for example but not limited to, through a wireless connection with an external system. The remote behaviors may include communications via one or more external networks. Non-limiting examples of remote behaviors include behaviors occurring via radio frequency (e.g., Bluetooth), local networks (e.g., WiFi), vehicle-to-vehicle connections, cellular network (e.g., a cellular network used by a telematics channel), global positioning system (GPS), Global System for Mobile Communications (GSM), and the like.

In a further embodiment, additional classifications may be determined. The additional classifications may include classifying the behavior with respect to sub-locations within the vehicle, physical proximity of external systems communicating with the vehicle, types of communication vectors, or combinations thereof.

The sub-locations may be predetermined sub-locations defined with respect to in-vehicle communications such as, but not limited to, predetermined communication layers, trust boundaries, network topologies, physical constraints, logical constraints, and the like. An attack may take a path of communications with respect to such sub-locations that is different from communications which occur when the vehicle is behaving normally. To this end, communications within the vehicle may be logically divided into stages that collectively form an attack path, where the stages represent different sub-locations such that behaviors may be classified with respect to combinations of these sub-locations based on the stages of communications constituting those behaviors.

In this regard, it is noted that attack paths may constitute multiple stages inside and/or outside the vehicle. In particular, an attack path may include a stage involving a communication between an external system and an internal system of the vehicle followed by one or more stages involving communications between internal systems of the vehicle. Thus, vehicle-related indicators may indicate different stages of an attack such that the combination of those indicators collectively demonstrates the attack path including all relevant stages.

With respect to physical proximity of communicating systems, remote behaviors may be further classified into short range or long range based on the physical proximity of the external system to the connected vehicle. Short-range behaviors involve systems that are external but physically proximate to the connected vehicle and may include, for example, behaviors occurring via Bluetooth, WiFi, vehicle-to-infrastructure connections, or vehicle-to-vehicle connections. Long-range behaviors involve systems that are physically far from the connected vehicle and may include, for example, behaviors occurring via a telematics channel, GPS, or GSM.

As to types of communication vectors, such vectors may be defined with respect to the type of system or program communicating with the vehicle. As a non-limiting example, a communication with an external system may be classified as a short message service (SMS) vector when the communication is received as a SMS message from a user device or as a telematics vector when the communication is received from a telematics server. In this regard, it is noted that some potential attack vectors are much easier to misuse than others (e.g., SMS messages may allow for easier attacks than telematics because access to a telematics server is typically more limited than access to a given user device) such that identifying the vector through which a system communicates with the vehicle can further improve accuracy when determining if a behavior indicates an attack.

At S220, one or more in-vehicle domain knowledge indicators related to the classified behavior are detected based on telemetries related to the connected vehicle.

In an embodiment, the domain knowledge indicators are detected using domain knowledge related to the connected vehicle. The domain knowledge includes predetermined domain knowledge and may include, but is not limited to, knowledge related to the type of vehicle (e.g., truck, car, plane, boat, robot etc.), to structure and architecture of the vehicle, to autonomous or non-autonomous vehicles, to the make, to the model, combinations thereof, and the like. The domain knowledge may be determined based on historical or otherwise predetermined (e.g., predetermined feasible cyber-attacks) cyber-attacks and subsequent connected vehicle telemetries.

The domain knowledge may include, but is not limited to, known errors caused by cyber-attacks, diagnostic trouble codes (DTCs) that commonly appear after certain cyber-attacks, or both. The errors include known cyber-related errors such as, but not limited to, authentication failures (e.g., failure to authenticate to an electronic control unit of the connected vehicle). In this regard, it has been identified that certain types of errors do not commonly occur in the absence of a cyber-attack. Accordingly, such errors are strong indicators of cyber-attacks.

The domain knowledge may further include data related to access of the vehicle. Such access may include, but is not limited to, connecting a device to the vehicle (e.g., an OBD dongle) or pushing data to the vehicle (e.g., a firmware over-the-air update). Such access may be indicative of a potential intrusion into the vehicle as part of an attack.

The DTCs include known DTCs that frequently (e.g., above a threshold number or proportion of times) appear shortly after (e.g., within a threshold time period) of cyber-attacks or other cybersecurity incidents. The DTCs are error codes indicating abnormal behavior recognized by the connected vehicle. It has been identified that, although DTCs may be related to mechanical issues, some types of DTCs often correlate with the appearance of cyber-attacks such that these DTCs are strong indicators of cyber-attacks.

At S230, one or more vehicle-related anomaly indicators related to the classified behavior are detected based on the telemetries related to the connected vehicle.

In an embodiment, the anomaly indicators are detected using a machine learning model trained to establish one or more baseline behaviors for the connected vehicle such that each anomaly is a deviation from a respective baseline behavior. The anomalies may be vehicle-specific or group-specific (e.g., specific to a group of connected vehicles such as a fleet or sub-fleet, vehicles of a particular make and model, vehicles of a particular sub-model, etc.).

In an embodiment, the anomaly indicators include abnormal values within a single field of telemetry data, abnormal values across multiple fields, abnormal values across multiple messages, abnormal commands with respect to location, uncommon errors, aggregations of errors identified using domain knowledge, or a combination thereof.

With respect to values of single fields, an example may be an unusual value in a field of data used for configuring a connected vehicle. As a non-limiting example, some telematics units may be configured via SMS message. As another non-limiting example, an electronic control unit (ECU) may attack another target ECU by sending a malformed velocity data value in a message where the malformed message field value data value would cause the target ECU to crash as a result of handling the value. An unusual value in the SMS message such as configuring the telematics unit to communicate with servers other than a pre-designated backend server may therefore be determined as anomalous.

With respect to values of multiple fields, the machine learning algorithm may be configured to correlate between data provided by different sensors and devices in a connected vehicle such that values from one sensor or device may be anomalous in combination with values of another sensor or device. As a non-limiting example, the machine learning model may be trained to correlate between a velocity value above 50 kilometers per hour and a deviation lane keep assist command (i.e., a command causing the vehicle to shift lanes) such that, for example, a deviation lane keep assist command executed when the vehicle has a velocity of 0 kilometers per hour is anomalous.

With respect to location profiling, combinations of a specific type of command being received and the connected vehicle being in a particular location may be anomalous for a given connected vehicle. In this regard, it has been identified that certain sensitive commands typically only occur in certain locations. For example, legitimate UDS messages are typically only received while the connected vehicle is in an auto repair shop. In contrast, a firmware over-the-air (FOMA) update may occur in various locations. Thus, receipt of a UDS message outside of a known garage location (e.g., a geographic location indicated in training data related to a connected vehicle) may be determined as anomalous.

With respect to uncommon errors, the machine learning model may be trained to learn common errors that occur for a connected vehicle or group of connected vehicles such that errors other than the learned common errors are determined as anomalous.

With respect to aggregation of domain knowledge errors, the machine learning model may be trained using a training data set including domain knowledge errors detected for a connected vehicle (for example, errors detected as described with respect to S220). Accordingly, an abnormally high (e.g., above a threshold) number of errors of a particular type of error may be an anomaly. As a non-limiting example, a high number of authentication failure may be anomalous. As another non-limiting example, multiple attempts to access administrative services or multiple failed attempts to access electronic control units (ECUs) may be anomalous.

As a non-limiting example for excessive attempts to access an administrative service, a number of attempts to access a Security Access UDS service is anomalous. In this regard, it has been identified that a common day zero exploit to allow for performing lateral movement inside a vehicle is by bypassing the Security Access UDS service since the Security Access service is an authentication mechanism for privileged operations in the vehicle. Thus, an attacker who bypasses the Security Access service can install a new firmware or otherwise execute code in the connected vehicle. A possible way to bypass this service is through brute force via a high number of attempts to access.

As a non-limiting example for multiple failed attempts to access ECUs, it has been identified that each UDS request is normally answered by an ECU such that failure to respond by multiple supposed ECUs is anomalous. More specifically, it has been identified that a common tactic for scanning the connected vehicle is to send multiple UDS requests to non-existent ECUs. A UDS request may be sent to each of the multiple ECUs. If a response is not received from one of the ECUs, the ECU does not exist. To this end, in an embodiment, S230 may include sending such requests. An anomaly is detected when a number of unanswered UDS requests is above a threshold.

At S240, risk analysis is performed based on a combination of vehicle-related cyber-attack indicators. The vehicle-related cyber-attack indicators include the domain knowledge indicators, the anomaly indicators, or both. The risk analysis may be performed using machine learning such that the degree of risk is determined based on training data related to connected vehicles. As a non-limiting example, when training data shows that roughly 50% of vehicles in a fleet have on-board diagnostics (OBD) devices installed, then the risk of a given connected vehicle having an OBD device is lowered.

In an embodiment, S240 includes determining the combination of indicators related to the behavior of the connected vehicle and comparing the combination of indicators to predetermined combinations of indicators for known attack patterns in order to determine a matching combination and, therefore, a matching known attack pattern. In a further embodiment, the predetermined combinations of indicators for known attack patterns which are compared to the determined combination of indicators include combinations of indicators of known attack patterns having the same classification or classifications as the combination of indicators (i.e., combinations of known local attack patterns are compared to the determined combination for a behavior when the behavior is classified as local, combinations of known remote attack patterns are compared to the determined combination for a behavior when the behavior is classified as remote, same for short-range or long-range remote behavior, etc.). In other words, combinations of indicators are compared to known attack patterns having the same classifications in order to see if any of the known attack patterns are present.

In a further embodiment, S240 further includes abstracting one or more indicators of the combination of indicators to determine an abstracted combination of indicators and comparing the abstracted combination of indicators to abstracted combinations of indicators of known attack patterns. The abstraction may be made with respect to, for example, a communication stage (e.g., a stage which involved a system establishing a connection inside the vehicle), a relative location, and the like. As a non-limiting example, an OBD device establishing a connection may be abstracted to the stage "connection of user device" such that the combination of indicators including that abstracted stage would match a combination of indicators of a known attack pattern including a charging device establishing a connection that was also abstracted to "connection of a user device."

In this regard, it has been identified that attack patterns with respect to a connected vehicle are more commonly exhibited via different locations relative to the vehicle. As a result, classifying behaviors based on such relative locations allows for more accurately determining the type of attack pattern among known attack patterns and, accordingly, more accurately analyzing potential risk. Consequently, appropriate mitigation actions to take in response to potential attacks may be determined more accurately, thereby improving the cyber-security of the connected vehicle.

In an embodiment, S240 further includes generating a risk score for each vehicle-related cyber-attack indicator. An example method for risk detection via scoring in connected vehicles is described further in U.S. patent application Ser. No. 17/060,910, the contents of which are hereby incorporated by reference. The risk scores may be utilized to determine mitigation actions, for example, by performing mitigation actions that will mitigate potential threats related to cyber-attack indicators demonstrating at least a threshold degree of risk.

In a further embodiment, S240 includes aggregating risk scores of cyber-attack indicators of a combination of indicators in order to generate an aggregated risk score indicating a level of risk of the combination of indicators. Each combination of cyber-attack indicators may be indicators detected with respect to a similar time (e.g., when the telemetries used to detect the respective indicators were collected within a threshold amount of time of each other).

In yet a further embodiment, the aggregated risk scores may be amplified based on degree of similarity between the combination of indicators and a known attack path, an ongoing status of the communications in which the indicators were identified (i.e., whether the communications are still ongoing or whether the communications have already terminated), both, and the like. To this end, each combination of indicators may be matched to indicators of known attack paths. The aggregated risk scores may be amplified differently based on the result of any attack having a matching known attack path, based on a feasibility of such a matching attack, or both. Consequently, the resulting risk scores may differ for attack paths having different results and feasibility.

In some implementations, the aggregate risk score is amplified based on how many points in a known attack path are identified when multiple points in any attack path are matched to indicators of the combination. When communications are still ongoing, the risk scores may be amplified to reflect the ongoing danger a potential attack may pose or the feasibility of completing a potential attack.

To identify points on an attack path, different indicators may be classified into points on known attack paths in order to model an attack path using each combination of indicators. The classification of indicators into points on attack paths may be determined using predetermined domain knowledge. As a non-limiting example, a short message service (SMS) anomaly is classified as an access while an engine speed anomaly is classified as an exploitation point.

A non-limiting example attack path may follow a pattern of "access→elevation→exploitation." The access is the initial creation of access to a connected vehicle by an attacker. The elevation includes an elevation of privilege for the accessing device. The exploitation is the actual exploitative action performed by the attacker such as, but not limited to, unlocking the connected vehicle's door. A matching attack pattern can be identified by comparing the combination of indicators representing the "access→elevation→exploitation" pattern to known attack patterns.

Figure 3:
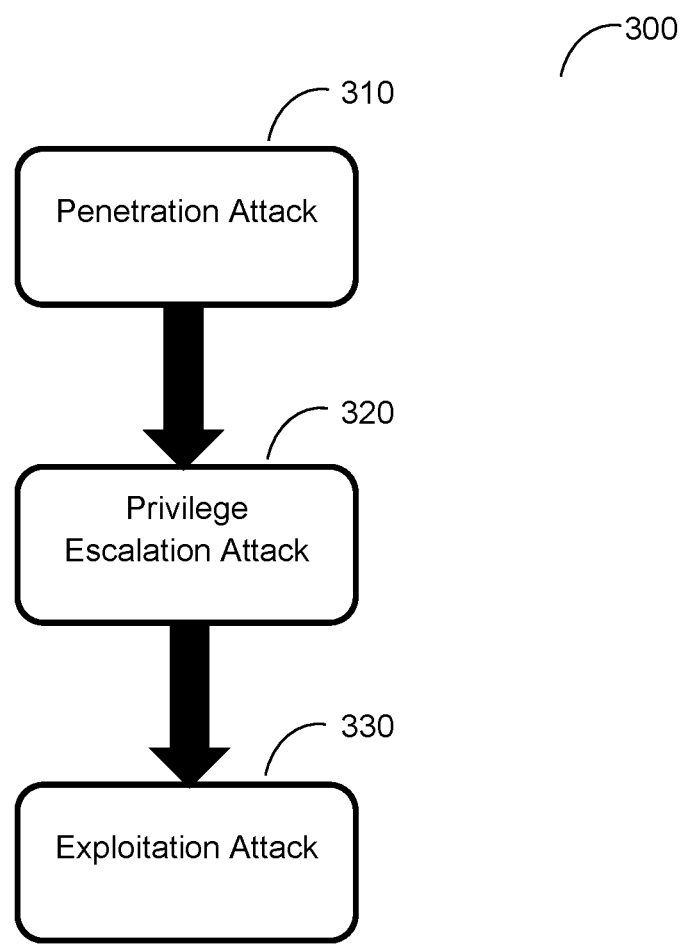
FIG. 3 is a flow diagram illustrating an example attack path.

An example attack path is shown in FIG. 3. In FIG. 3, an example attack path 300 includes a penetration attack 310 followed by a privilege escalation attack 320 then an exploitation attack 330. The penetration attack 310 provides access to the connected vehicle, the privilege escalation attack 320 represents an elevation of privilege for the attacker, and the exploitation attack 330 demonstrates the actual exploitation of the access.

Example penetration attacks may include, but are not limited to, presence of an OBD-II device during driving activities, an unknown or known bad firmware upgrade, and the like. Example privilege escalations may include, but are not limited to, unified diagnostics services (UDS), unauthorized commands, and the like. Example exploitation attacks may include, but are not limited to, frame injection, denial of service, and the like.

Returning to FIG. 2, the data used for risk scoring may further include integrated connected vehicle and cybersecurity data. The integration may include, but is not limited to, correlating violations including the cyber-attack indicators with cybersecurity event data related to the respective connected vehicles. Integrating connected vehicle security incident data with cybersecurity data is described further in U.S. patent application Ser. No. 16/890,671, the contents of which are hereby incorporated by reference.

In a further embodiment, the risk analysis may include both generating risk scores and determining a risk assessment based on integrated connected vehicle and cybersecurity data. As a non-limiting example, risk scores generated as described in U.S. patent application Ser. No. 17/060,910 may be utilized to determine a severity of a violation and to correlate the violation with similar risk score violations of other connected vehicles as described in the U.S. patent application Ser. No. 16/890,671.

At S250, one or more mitigation actions are determined and performed based on the risk analysis. The mitigation actions may include, but are not limited to, ceasing communications between the connected vehicle and one or more entities, terminating one or more connections (e.g., closing ports, terminating local wireless or network connections, etc.), preventing one or more activities by the connected vehicle, triggering a software or configuration update in the vehicle, suspending a software or configuration update in the vehicle, notifying a driver of the vehicle, or a combination thereof.

It should be noted that a particular order of steps shown in FIG. 2 is shown merely for simplicity, but that at least some steps may be performed in a different order. For example, in-vehicle errors and abnormalities may be detected in reverse order or in parallel without departing from the scope of the disclosure. Additionally, in some implementations, only errors or anomalies may be detected and used as indicators for risk scoring.

Figure 4:
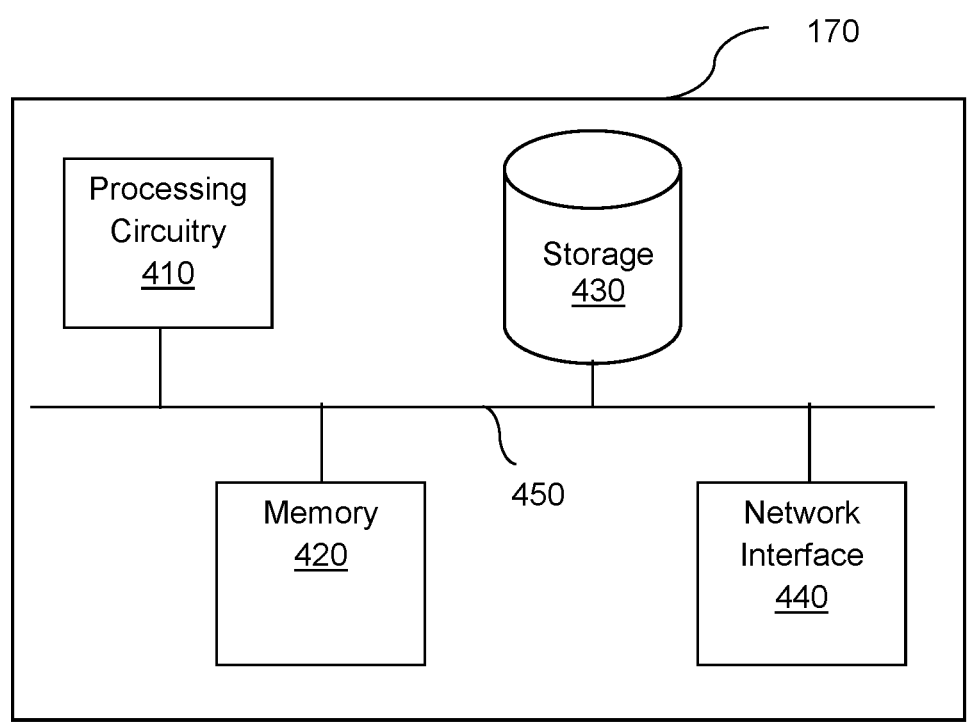
FIG. 4 is a schematic diagram of a detector according to an embodiment.

FIG. 4 is an example schematic diagram of a detector 170 according to an embodiment. The detector 170 includes a processing circuitry 410 coupled to a memory 420, a storage 430, and a network interface 440. In an embodiment, the components of the detector 170 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 may allow the detector 170 to communicate, for example via the short-range communications network 130 or the long-range communications network 150.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The invention claimed is:

1. A method for detecting and mitigating cyber-attacks directed to connected vehicles, comprising:
    classifying a behavior of a connected vehicle into at least one classification with respect to a location of data transmission relative to the connected vehicle, wherein the at least one classification includes any of local and remote;
    determining a plurality of vehicle-related cyber-attack indicators related to the behavior of the connected vehicle;
    performing risk analysis based on a first combination of vehicle-related cyber-attack indicators and the at least one classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle;
    wherein performing the risk analysis further comprises generating a risk score for each of the plurality of vehicle-related cyber-attack indicators;
    wherein performing the risk analysis further comprises generating an aggregated risk score based on the risk score generated for each vehicle-related cyber-attack indicator of the first combination; and
    performing at least one mitigation action based on the aggregated risk score.

2. The method of claim 1, wherein performing the risk analysis further comprises:
    determining a matching second combination of the plurality of second combinations for the first combination; and
    amplifying the aggregated risk score based on a degree of similarity between the first combination and the matching second combination, wherein the at least one mitigation action is determined based further on the amplified aggregated risk score.

3. The method of claim 1, wherein the plurality of vehicle-related cyber-attack indicators includes a plurality of domain knowledge indicators, wherein each domain knowledge indicator is a known cyber-attack indicator for a type of the connected vehicle.

4. The method of claim 1, wherein the plurality of vehicle-related cyber-attack indicators includes a plurality of vehicle-related anomaly indicators, wherein each vehicle-related anomaly indicator includes an abnormal value for the connected vehicle.

5. The method of claim 1, wherein the behavior of the connected vehicle is classified as local when the behavior includes transmission of data only within the connected vehicle.

6. The method of claim 1, wherein the behavior of the connected vehicle is classified as remote when the behavior includes transmission of data outside of the connected vehicle.

7. The method of claim 1, wherein remote behavior is classified further into any of short-range and long-range.

8. A non-transitory computer readable medium having stored thereon instructions for causing a processing circuitry to execute a process, the process comprising:
    classifying a behavior of a connected vehicle into at least one classification with respect to a location of data transmission relative to the connected vehicle, wherein the at least one classification includes any of local and remote;
    determining a plurality of vehicle-related cyber-attack indicators related to the behavior of the connected vehicle;
    performing risk analysis based on a first combination of vehicle-related cyber-attack indicators and the at least one classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle;

wherein performing the risk analysis further comprises generating a risk score for each of the plurality of vehicle-related cyber-attack indicators;

wherein performing the risk analysis further comprises generating an aggregated risk score based on the risk score generated for each vehicle-related cyber-attack indicator of the first combination; and performing at least one mitigation action based on the aggregated risk score.

9. A system for detecting and mitigating cyber-attacks directed to connected vehicles, comprising:

a processing circuitry; and a memory, the memory containing instructions that, when executed by the processing circuitry, configure the system to:

classify a behavior of a connected vehicle into at least one classification with respect to a location of data transmission relative to the connected vehicle, wherein the at least one classification includes any of local and remote;

determine a plurality of vehicle-related cyber-attack indicators related to the behavior of the connected vehicle;

perform risk analysis based on a first combination of vehicle-related cyber-attack indicators and the at least one classification, wherein the first combination of vehicle-related cyber-attack indicators is a combination of at least a portion of the plurality of vehicle-related cyber-attack indicators, wherein performing the risk analysis further comprises matching the first combination to a plurality of second combinations of cyber-attack indicators of a plurality of known attack patterns, wherein each of the plurality of known attack patterns has at least one classification matching the at least one classification of the connected vehicle;

wherein the system is further configured to generate a risk score for each of the plurality of vehicle-related cyber-attack indicators;

wherein the system is further configured to generate an aggregated risk score based on the risk score generated for each vehicle-related cyber-attack indicator of the first combination; and perform at least one mitigation action based on the aggregated risk score.

10. The system of claim 9, wherein the system is further configured to:

determine a matching second combination of the plurality of second combinations for the first combination; and amplify the aggregated risk score based on a degree of similarity between the first combination and the matching second combination, wherein the at least one mitigation action is determined based further on the amplified aggregated risk score.

11. The system of claim 9, wherein the plurality of vehicle-related cyber-attack indicators includes a plurality of domain knowledge indicators, wherein each domain knowledge indicator is a known cyber-attack indicator for a type of the connected vehicle.

12. The system of claim 9, wherein the plurality of vehicle-related cyber-attack indicators includes a plurality of vehicle-related anomaly indicators, wherein each vehicle-related anomaly indicator includes an abnormal value for the connected vehicle.

13. The system of claim 9, wherein the behavior of the connected vehicle is classified as local when the behavior includes transmission of data only within the connected vehicle.

14. The system of claim 9, wherein the behavior of the connected vehicle is classified as remote when the behavior includes transmission of data outside of the connected vehicle.

15. The system of claim 9, wherein remote behavior is classified further into any of short-range and long-range.

* * * * *